Sept. 22, 1953 M. PALO ET AL 2,653,191

PICKUP CARTRIDGE AND TONE ARM ASSEMBLY FOR PHONOGRAPHS

Filed May 5, 1952 2 Sheets-Sheet 1

INVENTOR
MAURICE PALO
ALEXANDER L. DVORSKY

BY Francis J. Klempay
ATTORNEY

PICKUP CARTRIDGE AND TONE ARM ASSEMBLY FOR PHONOGRAPHS

Filed May 5, 1952 2 Sheets-Sheet 2

INVENTOR
MAURICE PALO
ALEXANDER L. DVORSKY

BY Francis J. Klempay
ATTORNEY

Patented Sept. 22, 1953 2,653,191

UNITED STATES PATENT OFFICE 2,653,191

PICKUP CARTRIDGE AND TONE ARM ASSEMBLY FOR PHONOGRAPHS

Maurice Palo and Alexander L. Dvorsky, Conneaut, Ohio, assignors to The Astatic Corporation, Conneaut, Ohio, a corporation of Ohio Application May 5, 1952, Serial No. 286,164

12 Claims. (Cl. 179—100.41)

This application is a continuation-in-part of our co-pending application Ser. No. 58,302, filed November 4, 1948, for improvements in Universal Electric Tone Arms, now Patent No. 2,601,126, issued June 17, 1952.

The present invention, and the invention disclosed in our above mentioned co-pending application, relates to electrical sound reproducing apparatus, and more particularly to improvements in that portion of such apparatus which is employed in sensing mechanical undulations of a phonograph record disc and translating the same into electrical energy waves suitable for reproduction in the form of an audible sound or tone. This portion of the apparatus, commonly termed a tone arm or pick-up arm, normally comprises an arm which is pivotally mounted at one of its ends for movement about horizontal and transverse axes whereby a record groove engaging stylus projecting from the free end of the arm may be caused to track the record groove across the face of the record.

Of the two recording systems now generally in use, one requires the record disc to rotate at a speed of approximately 78 R. P. M. and the stylus to have a tip radius of three mils, while the other utilizes a 33⅓ R. P. M. or 45 R. P. M. record speed and requires a smaller stylus of approximately one mil tip radius. Accordingly it is an object of the present invention to provide a tone arm assembly, including electro-mechanical means for sensing record groove undulations, which among other things is readily adaptable for alternate employment in either of the above mentioned common recording systems.

Another object of the invention is the provision of an improved construction for universally usable tone arms whereby the same are rendered ideally suited for use with phonographic reproducing apparatus of the type having automatic means for changing record discs and resetting the tone arm whereby to furnish substantially continuous sound reproduction from a plurality of separate record discs. To this end our invention seeks to provide a tone arm and pick-up cartridge assembly which, while being selectively usable for either of the above mentioned recording systems, is light in weight and hence readily operated from near its pivotally mounted end. And as a further and perhaps more important consideration we have sought to provide a tone arm which has a silhouette of minimum thickness so that the arm may be readily manipulated in the often small vertical clearance between record discs positioned on a playing table and those held vertically above by the record changing apparatus.

Another object of the present invention is the provision of a combined tone arm and electromechanical pick-up cartridge wherein a pick-up cartridge carrying a plurality of divergently related record groove engaging stylii may be readily "plugged in" to the tone arm by an unskilled operator and without the use of tools of any kind, and wherein the pick-up cartridge so held in the tone arm may be manipulated by an operator so as to selectively present any of the plurality of stylii for engagement with a record groove.

A further and more specific object of the present invention is the provision of a combined pick-up cartridge and tone arm assembly having a plurality of radially divergent record engaging stylii wherein the pick-up cartridge may be plugged in or inserted longitudinally into the tone arm and held therein by suitable easily released detent means whereby the cartridge may be readily changed when necessary and whereby the cartridge may be rotated within its mounting socket to present certain of the radially divergent stylii for record engagement.

The above and other objects and advantages of the invention will become apparent upon full consideration of the following detailed specification and accompanying drawing wherein are illustrated certain preferred embodiments of our invention.

Figure 1:
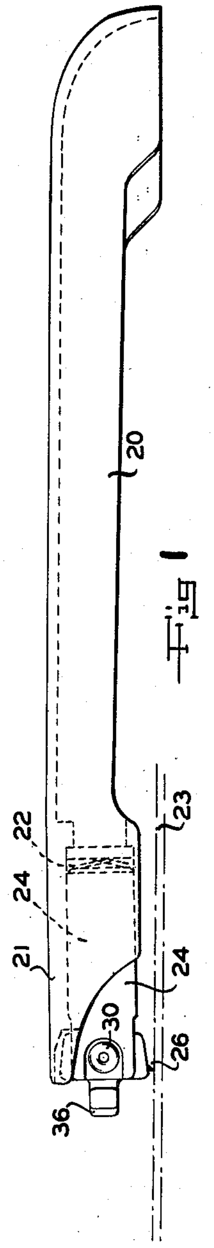
Figure 1 is a side elevation of a tone arm and pick-up cartridge assembly constructed in accordance with the teachings of our invention.
Figure 2:
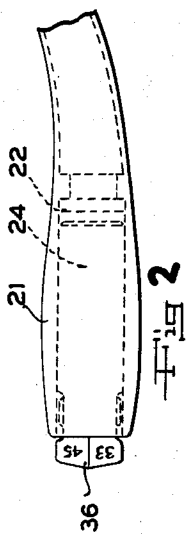
Figure 2 is a fragmentary plan view of the apparatus of Figure 1.
Figure 3:
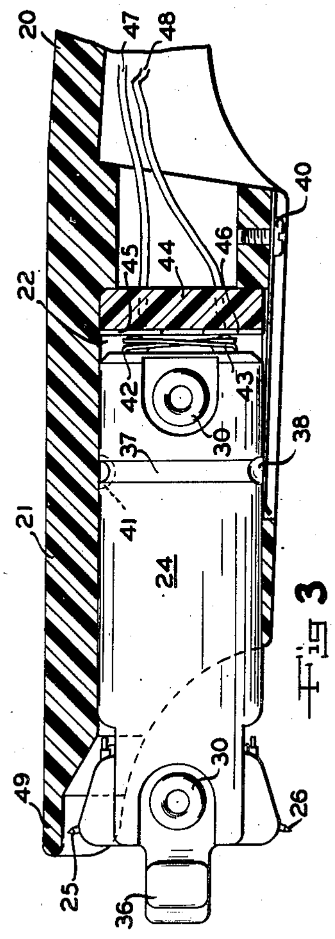
Figure 3 is an enlarged fragmentary section view taken substantially along the principal longitudinal axis of the apparatus of Figure 2.

Referring initially to the embodiment illustrated in Figures 1–5, the reference numeral 20 designates a phonograph tone arm which is conventionally of cast or molded construction having suitable means, not shown, at its right hand end for mounting the arm on phonograph apparatus for universal pivotal movement. In accordance with the teachings of our invention the outer or free end 21 of the arm 20 is substantially cylindrical in exterior outline and is provided internally with a cylindrical bore 22 which is approximately alinged with the principal axis of the arm 20. The lower side of the extreme end portion of the arm 20 is provided with a cut-away portion substantially as shown in Figures 1 and 3 and this feature serves to improve the operating clearance between the outer portion 21 and a record disc 23 as well as to permit a record groove engaging stylus to be exposed for engagement with a record disc as will subsequently be more fully brought out.

Slidably insertable into the cylindrical bore 22 is a similarly cylindrical pick-up cartridge case 24 having a pair of radially disposed oppositely directed record engaging stylii 25 and 26. It is consistent with the teachings of our present invention that the sliding fit between the cartridge 24 and bore 22 be one of relatively close tolerance so that the cartridge 24 may be adequately supported in the arm 20 solely by integral portions of the arm 20 and without additional mounting saddles or other devices as has heretofore been thought to be required for practical apparatus of this nature.

Figure 4:
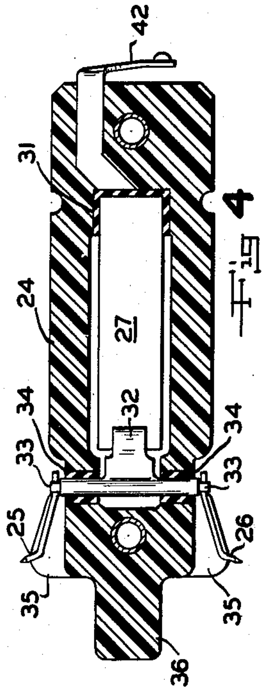
Figure 4 is a longitudinal section view of a replaceable pick-up cartridge of the type utilized in the apparatus of Figure 1.

By using an axially aligned cartridge 24 we have been able to incorporate in our apparatus an electro-mechanical transducing assembly of a type which has heretofore been found superior for use in phonograph reproducing apparatus. The approved arrangement is illustrated in Figure 4 and comprises an axially aligned bending type piezo-electric crystal element 27 which is clamped at one end only to the cartridge case 24, which case preferably comprises symmetrical half sections 28 and 29 which are held in assembled relation by means of spaced transversely disposed rivets 30 and/or suitable cement. Conventionally, resilient rubber mounting members 31 are provided in each of the casing parts 28 and 29 for resiliently holding the piezo-electric element 27.

Clamped to the forward end of the crystal 27 is a combined stylus chuck and crystal driving member 32, the stylus chuck portion of which is transversely mounted in the casing 24 and adapted to telescopically receive mounting shanks 33 of the oppositely related stylii 25 and 26. In accordance with heretofore known principles the stylus chuck is resiliently mounted in the casing 24 by means of spaced rubber sleeves 34 which permit resiliently opposed pivotal movement of the chuck about its principal axis, which movement is translated by the driving member into proportional bending of the crystal 27. Also in accordance with heretofore known principles driving shanks 33 may be suitably keyed or otherwise drivingly connected to the stylus chucks whereby side-to-side movement of the stylus record groove engaging tip in following the lateral undulations of the record sound track may be transferred to the stylus chuck in the form of pivotal movement thereof about its principal axis.

Figure 5:
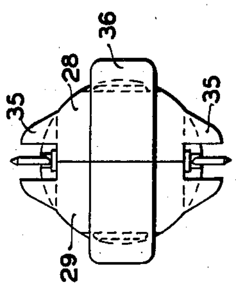
Figure 5 is an end view of the pick-up cartridge of Figure 4.
Figure 6:
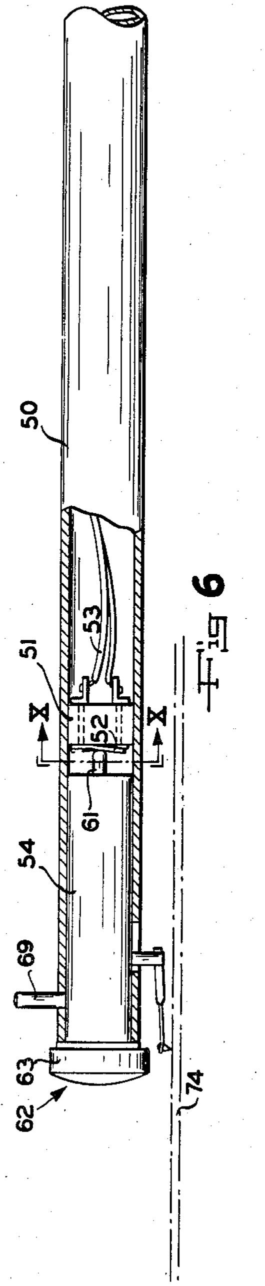
Figure 6 is a side elevation of a second embodiment of our invention.
Figure 9:
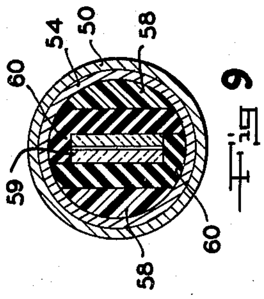
Figures 8, 9 and 10 are transverse section views taken along lines VIII—VIII, IX—IX and X—X respectively of Figures 6 and 7.
Figure 10:
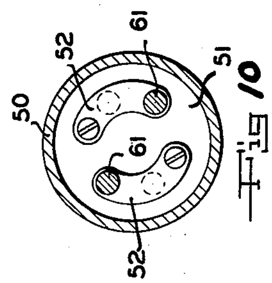

To protect the stylii 25 and 26 from damage caused by dropping the tone arm 20 on the record disc 23 or on the revolving table or platen, not shown, we have provided stylus guards 35 which extend integrally from the outer end portion of the casing 24 as shown in Figures 4 and 5 whereby to prevent abnormal inward deflection of the stylus tips as might otherwise occur if the assembled arm 20 and cartridge 24 was dropped or otherwise mishandled.

In the embodiment illustrated in Figures 1–5 we have provided a pair of radially disposed oppositely related stylii 25 and 26 which are adapted to be selectively presented for engagement with a record disc 23, and accordingly we have provided that the cartridge case 24 may be rotated within the cylindrical bore 22 so that the case 24 may be positioned in either of two radial dispositions wherein one or the other of the stylii 25 and 26 is positioned in the cut-away portion of the arm 20. To facilitate rotation of the case 24 we have provided a control knob 36 which is positioned at the outer end extremity of the casing 24 as an integral part thereof. The bore 22 and casing 24 are so proportioned that the knob 36 projects axially outward of the arm 20 so that it may be readily grasped by an operator and appropriately rotated to present a desired stylus for record engagement. Suitable indicia may also be provided on the control knob 36 so that an operator may readily ascertain from a remote viewing position which of the two stylii is in operating position.

In order to hold the cartridge casing 24 in either of its two operating positions, and also to retain the casing 24 in inserted or plugged-in position within the bore 22 we have provided detent means including an annular recess 37 in the cartridge casing 24 and a spring biased detent ball 38 carried by the tone arm 20. The ball 38 is mounted on a leaf spring member 39 which is in turn secured to the outer portion 21 of arm 20 by means of a screw 40. The arrangement, as will be observed in Figure 3, is such that the ball 38 follows annular groove or recess 37 so that the casing 24 is at all times held, though releaseably so, in plugged-in position. In addition, a pair of diametrically opposed detent stops 41 are provided in the groove 37 whereby when the casing is rotated to one or the other of its operative positions the operator may immediately feel the apparatus snap into position, whereupon the casing will be retained in such position until subsequent intentional movement by an operator.

To transmit the mechanically generated electrical impulses from the piezo-electric element 27 to an amplifier, not shown, or other device for audible reproduction we have provided a pair of resilient contact members 42 and 43 which are carried by the casing in contact with opposite terminals of the crystal element 27 and which extend axially rearward of the casing 24 as shown in Figures 3 and 4. Positioned at the innermost end of the cylindrical bore 22 is an insulating disc 44 mounting a pair of stationary contact plates 45 and 46 which connect conductors 47 and 48 and which are adapted to make contact with the resilient members 42 and 43 when the cartridge 24 is in an operative plugged-in position. By this arrangement the pick-up cartridge is automatically provided with electrical connection to the amplifying apparatus, not shown, upon assembly of the cartridge 24 into the tone arm 20 regardless of which of the operative positions the cartridge is set. The same electrical connection is of course provided when the cartridge 24 is subsequently rotated to a new operative position.

To avoid accidental damage to the inoperative or upwardly directed stylus of our assembly we have provided an annularly recessed hood 49 which comprises an integral extreme outer end portion of the arm 21 and which extends outwardly of the main body of the arm 20 a sufficient distance to conceal and shield the inoperative stylus 25. Where desired the recessed hood 49 may be provided interiorly with a suitable resilient member, not shown, to make contact with the inoperative stylus and thereby prevent undesirable sympathetic vibrations of the same which may be set up when the operative or exposed stylus is tracking a record groove and undulating therein at certain frequencies.

In the embodiment of the invention shown in Figures 6 through 10 the outer end portion 50 of a tone arm comprises a length of light-weight metal or plastic tubing, and it will be understood that the complete tone arm will include suitable means, not shown, mounted at the opposite end of the tube for supporting the arm for pivotal movement about horizontal and vertical axes as common in this art. Rigidly secured in the tube a predetermined distance from the open end thereof is an insulating disc 51 which mounts on its front face a pair of arcuately disposed contacts 52, the latter of which are connected by conductors extending through the disc 51 to suitable wires 53 leading to amplifying apparatus, not shown.

Slidably insertable into the open outer end of the tube 50 outwardly of the disc 51 is a cylindrical pick-up cartridge which comprises a tubular casing 54 of metal or plastic material, which casing is provided with a large arcuately disposed aperture 55 in its lower wall and a small aperture 56 in its upper wall, both disposed in the forward end portion of the casing 54. Tightly received in the rear end portion of the tubular casing 54 is a plug 57 formed of insulating material and having two integral forwardly extending bifurcations 58. Clamped between the bifurcations 58 is one end of a piezo-electric crystal element 59, and in accordance with usual practice in this art suitable rubber wedge blocks 60 are interposed between the crystal element 59 and the bifurcations 58 to provide a resilient mounting for the crystal 59. Also supported by the plug 57 is a pair of spaced terminal connectors 61 which are adapted to engage the arcuate contacts 52 to establish electrical connection between the crystal and the conductors 53, it being noted that in the complete cartridge assembly metallic foil leads 61′ connect the terminals 61 with the crystal element 59 in accordance with usual practice.

Tightly received in the forward end of the casing 54 is a control knob 62, suitable for rotating the casing 54 within the tubular arm 50, which knob 62 is provided with an enlarged outer exposed end portion 63 and a bore 64 extending axially from its inner end face. The bore 64 is centrally disposed in the knob 62, and received therein is a pair of spaced rubber sleeves 65 in which is journaled a drive shaft 66 having at its rear end a clamp 67 for engaging and flexing the forward end of the crystal element 59.

Rigidly connected to the drive rod 66 and extending radially therefrom in divergent relation is a pair of tubular sockets 71, each of which is adapted to frictionally receive the mounting shank portion 72 of a record groove engaging stylus 80. In accordance with the objects of this invention one of these stylii may be suitable for one type of record groove while the other is suitable for another type so that by simply rotating the cartridge 54 from one to the other of two operative positions the tone arm may be readied for playing records of otherwise incompatible systems.

Figure 8:
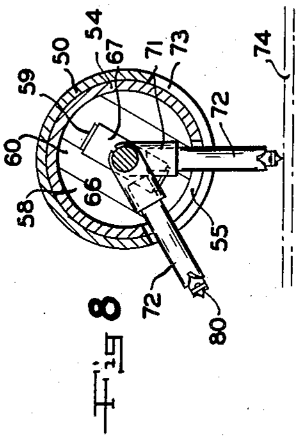
Figure 7:
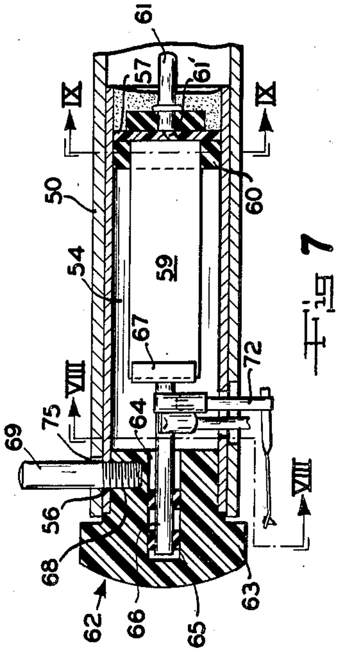
Figure 7 is an enlarged fragmentary longitudinal section view of the apparatus of Figure 6.

As illustrated in Figures 7 and 8 the tubular tone arm 50 is provided near its outer end with an arcuate cut-away portion 73 from which the stylii 80 may extend to the playing surface of a record disc 74, and of course the cut-away portion is sufficiently long arcuately to permit rotary movement of the cartridge between two operative positions wherein each of the stylii 80 may be positioned vertically for proper engagement with the disc 74.

Where desired we may provide suitable stylus guard means, not shown, for the stylii 80, similar to guards 35 of Figure 5, so that the stylii 80 will be protected from damage due to dropping and other mishandling. Where provided, such guards, not shown, will preferably comprise integral radially extending moulded portions of the control knob 62, and it will be readily understood that no alterations to the tone arm 50 are required for this provision.

To releasably retain the cartridge 54 in plugged-in position in the cylindrical arm 50 we may provide suitable detent means, not shown, as in the first illustrated embodiment, or alternately we may utilize a radially extending short threaded pin 69 which is received in the aperture 56 and retained in a threaded bore 68 in the control knob 62. An arcuate slot 75 positioned in the upper front end portion of the arm 50 receives the pin 69 and permits the same to be rotated along with the cartridge casing 54. The pin 69 serves several functions, the first and most important of which is to restrain the cartridge 54 from outward movement away from the resilient spring contact members 52. As clearly illustrated in Figure 7 the pin 69 prevents outward axial movement of the cartridge 54 by engaging the front shoulder of the arcuate slot 75. The pin 69 as well as stylus mounting shanks 72, must of course be removed in assembling or disassembling the cartridge from the tubular arm and accordingly the pin should be readily removable from the threaded bore 68.

In addition to the above mentioned primary function, the pin 69 may be additionally used as an operator for rotating the cartridge 54, and for limiting the rotary movement of the cartridge so that in either of two extreme limit positions one or the other of the different stylii 80 will be properly presented for engagement with the record disc 74.

Either of the above described embodiments of our invention is particularly advantageous in the art of phonographic sound reproduction in that an economical and highly practical arrangement is afforded for utilizing in a replaceable cartridge tone arm assembly, a plurality of selectively usable record engaging stylii. Our arrangement, in addition to being ultimately simple and commercially practicable, is wholly consistent with the use of heretofore proven and accepted transducer arrangements wherein the crystal element is disposed longitudinally of the tone arm and a plurality of record engaging stylii project first radially of the crystal element and then forwardly over the record surface whereby the mechanical side-to-side undulations of the record groove may be most accurately transmitted to the electro-mechanical element for ultimate translation into electrical energy capable of high fidelity reproduction in the form of audible tones.

Our assembly provides a novel arrangement for inserting a pick-up cartridge into a suitable socket in a tone arm, whereupon the cartridge is automatically provided with electrical contact with amplifying apparatus or the like, which electrical contact is maintained when the cartridge is subsequently rotated in its socket to present any certain one of a plurality of stylii for engagement with a record surface. It will be noted in this respect that we have accomplished the above without the use of additional saddles or cartridge carrying members. Rather, the result may be accomplished by a simple coaction between integral parts of the tone arm and the cartridge casing.

The present invention is also wholly consistent with certain considerations attendant to the use of the apparatus in phonograph machines utilizing automatic record changing equipment. Thus, for example, we have provided an extremely compact arrangement which has a minimum vertical silhouette or outline and is accordingly easily maneuvered within the vertical clearance space between record discs supported upon a rotating platen or table and those positioned above in the record changing apparatus. In addition, our apparatus, possessing a minimum number of parts, is light in weight at its outer unsupported end and is therefore well suited for manipulation by means acting near the pivotally mounted end as is a common arrangement in automatic or semi-automatic record playing apparatus. It should be understood, however, that the embodiments herein specifically described are intended to be illustrative only, and reference should therefore be had to the appended claims in determining the full and true scope of the invention.

We claim:

1. In a tone arm and pick-up cartridge assembly usable in phonograph apparatus of the type having a flat record disc supporting platen, the combination of a tone arm having a free end and adapted to be pivotally mounted at its other end for vertical and horizontal movement with respect to said platen, said arm having an open-ended cylindrical bore in its free end, said bore being arranged to be approximately parallel to said platen when said tone arm is in operative position with respect to a record supported by said platen, a first pair of spaced electrical contact members positioned at the inner end of said bore, a pick-up cartridge having a cylindrical body portion complementary to said cylindrical bore and slidably insertable therein from said open end, said cartridge being rotatable within said bore when in an inserted position, said cartridge having an axially disposed electro-mechanical element therein and a pair of oppositely related record groove engaging stylii connecting said element and extending first radially and then axially therefrom, said tone arm having a cut-away lower portion and an interiorly annularly recessed upper portion at its extreme outer end whereby one of said stylii may be exposed for engagement with a record disc while the other of said stylii is received in said recessed upper portion, a second pair of contact members carried by said cartridge and extending rearwardly therefrom whereby to connect said electro-mechanical element to said first mentioned contact members when said cartridge is inserted in said bore, and cooperative detent means carried by said cartridge and said arm for releasably retaining said cartridge in inserted position in said bore, said detent means including a pair of detent stops wherein one or the other of said stylii are exposed for record engagement.

2. In a tone arm and pick-up cartridge assembly usable in phonograph apparatus of the type having a flat record disc supporting platen, the combination of a tone arm having a free end and adapted to be pivotally mounted at its other end for vertical and horizontal movement with respect to said platen, said arm having an open-ended cylindrical bore in its free end, said bore being arranged approximately axially of said tone arm, a first pair of spaced electrical contact members positioned at the inner end of said bore, a pick-up cartridge having a cylindrical body portion complementary to said cylindrical bore and slidably insertable therein from said open end, said cartridge being rotatable within said bore when in an inserted position, said cartridge having an axially disposed electro-mechanical element therein and a pair of oppositely related record groove engaging stylii connecting said element and extending first radially and then axially therefrom, said tone arm having a cut-away lower portion and a recessed upper portion at its extreme outer end whereby one of said stylii may be exposed for engagement with a record disc while the other of said stylii is received in said recessed upper portion, a second pair of contact members carried by said cartridge and extending rearwardly therefrom whereby to connect said electro-mechanical element to said first-mentioned contact members when said cartridge is inserted in said bore, and releaseable detent means for retaining said cartridge in inserted position while permitting rotation of said cartridge with respect to said arm to selectively present either of said stylii at said cut-away portion.

3. In a tone arm and pick-up cartridge assembly usable in phonograph apparatus of the type having a flat record disc supporting platen, the combination of a tone arm having a free end and adapted to be pivotally mounted at its other end for vertical and horizontal movement with respect to said platen, said arm having an integral open-ended cylindrical recessed portion in its free end, said recessed portion being arranged to be approximately parallel to said platen when said tone arm is in operative position with respect to a record supported by said platen, first electrical contact means positioned at the inner end of said recessed portion, a pick-up cartridge having a cylindrical body portion complementary to said cylindrical recessed portion and slidably insertable therein from said open end, said cartridge being rotatable within said recessed portion when in an inserted position, said cartridge having an electro-mechanical element therein and a pair of divergently related record groove engaging stylii connecting said element and extending radially from said cartridge from positions intermediate its axial ends, said tone arm having a cut-away lower portion whereby one of said stylii may be exposed for engagement with a record disc, second contact means carried by said cartridge and extending rearwardly therefrom whereby to connect said electro-mechanical element to said first mentioned contact means when said cartridge is inserted in said recessed portion, and disengagable means for resisting longitudinal movement of said cartridge with respect to said recessed portion when said cartridge is in said inserted position, said disengagable means being adapted to permit rotary movement of said cartridge within said recessed portion.

4. Apparatus according to claim 3 further characterized by said disengagable means comprising annular groove means on said cartridge and resilient projection means on said arm, said groove means including a pair of stop portions adapted to engage said projection means to releaseably prevent rotation of said cartridge in said recessed portion, said stop portions being arranged to engage said projection means whenever one or the other of said stylii is exposed for engagement with a record.

5. Apparatus according to claim 3 further characterized by said disengagable means comprising an annular slot in said tone arm and a radially directed pin disengagably received in said cartridge and extending outwardly of said tone arm through said slot.

6. Apparatus according to claim 3 further characterized by said tone arm having an interiorly annularly recessed upper portion at its extreme outer end whereby when one of said stylii is exposed for engagement with a record the other of said stylii is received in said recessed upper portion.

7. Apparatus according to claim 3 further characterized by said cartridge having an axially extending control knob located axially outward of said stylii and of the open end of said tone arm whereby to be visible to and engagable from an operating position above said tone arm, said control knob including indicia means visible from said operating position for indicating which of said stylii is exposed for record engagement.

8. In a tone arm and pick-up cartridge assembly usable in phonograph apparatus of the type having a flat record disc supporting platen, the combination of a tone arm having a free end and adapted to be pivotally mounted at its other end for vertical and horizontal movement with respect to said platen, said arm having an integral open-ended cylindrical recessed portion in its free end, said recessed portion being arranged to be approximately parallel to said platen when said tone arm is in operative position with respect to a record supported by said platen, first electrical contact means positioned at the inner end of said recessed portion, a pick-up cartridge having an elongated cylindrical body portion complementary to said cylindrical recessed portion and slidably insertable therein from said open end, said cartridge being rotatable within said recessed portion when in an inserted position, said cartridge having an axially disposed electro-mechanical element therein and a pair of divergently related record groove engaging stylii connecting said element and extending radially from said cartridge, second electrical contact means carried by said cartridge and adapted to engage said first contact means when said cartridge is in inserted position in said tone arm, and disengageable means to prevent relative axial movement of said tone arm and cartridge from said inserted position, said elongated body portion and said cylindrical recess portion cooperating to provide substantially the entire mechanical support for said cartridge.

9. In a tone arm and pick-up cartridge assembly usable in phonograph apparatus of the type having a flat record disc supporting platen, the combination of a tone arm having a free end and adapted to be pivotally mounted at its other end for vertical and horizontal movement with respect to said platen, said arm having an integral open-ended cylindrical recessed portion in its free end, said recessed portion being arranged to be approximately parallel to said platen when said tone arm is in operative position with respect to a record supported by said platen, first electrical contact means carried by said tone arm in said recessed portion, a pick-up cartridge having an elongated cylindrical body portion complementary to said cylindrical recessed portion and slidably insertable therein, said cartridge being rotatable within said recessed portion when in an inserted position, said cartridge having an axially disposed electro-mechanical element therein and a pair of divergently related record groove engaging stylii connecting said element and extending first radially from and then axially forward of said cartridge, second electrical contact means carried by said cartridge and adapted to engage said first contact means when said cartridge is in inserted position in said tone arm, and disengageable means to prevent relative axial movement of said tone arm and said cartridge from said inserted position, said elongated body portion and cylindrical recess portion cooperating to provide substantially the entire mechanical support for said cartridge.

10. Apparatus according to claim 9 further characterized by said cylindrical recessed portion comprising an axially disposed bore in an integral free end portion of said tone arm, said cylindrical recessed portion having a cut-away lower portion and an interiorly annularly recessed upper portion whereby one of said stylii may be exposed for record engagement while the other of said stylii is received in said annularly recessed portion.

11. Apparatus according to claim 9 further characterized by said cylindrical recessed portion comprising an integral outer end portion of said tone arm having a cut-away lower portion whereby one of said stylii may be exposed for record engagement, and a control knob at the outer end of said cartridge arranged to extend axially outward of said tone arm for manipulation from an operating position above the upper side of said tone arm.

12. Apparatus according to claim 9 further characterized by said disengageable means being carried in part by said cartridge member and in part by said tone arm member and comprising annular groove means on one of said members and groove-engaging projection means carried by the other of said members, said projection means being adapted to engage said groove when said cartridge is in said inserted position whereby to restrain relative axial movement between said cartridge and tone arm while permitting relative rotary movement therebetween.

MAURICE PALO.
ALEXANDER L. DVORSKY.

No references cited.